United States Patent
Pyo

(10) Patent No.: US 6,520,562 B2
(45) Date of Patent: Feb. 18, 2003

(54) GLASS HOLDING DEVICE FOR MID-GATES OF VEHICLES

(75) Inventor: Ha Geun Pyo, Ulsan (KR)

(73) Assignee: Hyundai Motor Company, Seoul (KR)

(*) Notice: Subject to any disclaimer, the term of this patent is extended or adjusted under 35 U.S.C. 154(b) by 0 days.

(21) Appl. No.: 10/012,379

(22) Filed: Dec. 12, 2001

(65) Prior Publication Data

US 2002/0070582 A1 Jun. 13, 2002

(30) Foreign Application Priority Data

Dec. 12, 2000 (KR) .......................................... 00-75581

(51) Int. Cl.[7] .................................................. B60J 5/00
(52) U.S. Cl. ............... 296/146.2; 296/147; 296/190.11; 296/183
(58) Field of Search ............................. 296/146.2, 147, 296/146.8, 146.13, 190.11, 190.1, 201, 146.16, 183, 26.11

(56) References Cited

U.S. PATENT DOCUMENTS

| 2,747,921 A | * | 5/1956 | Hooverson et al. | 296/146.16 |
| 3,770,312 A | * | 11/1973 | Shadburn | 296/146.16 |
| 5,934,727 A | * | 8/1999 | Storc et al. | 296/26.11 |
| 6,260,916 B1 | * | 7/2001 | Hunt | 296/146.16 |
| 6,419,299 B1 | * | 7/2002 | Pyo | 296/106 |
| 2002/0074821 A1 | * | 6/2002 | Pyo | 296/106 |

FOREIGN PATENT DOCUMENTS

| FR | 569490 | * | 4/1924 | 296/147 |
| JP | 63-141823 A | * | 6/1988 | 296/146.8 |
| JP | 63-176717 A | * | 7/1988 | 296/147 |
| JP | 5-112142 A | * | 5/1993 | 296/51 |

* cited by examiner

Primary Examiner—D. Glenn Dayoan
Assistant Examiner—Patricia L. Engle
(74) Attorney, Agent, or Firm—Antonelli, Terry, Stout & Kraus, LLP

(57) ABSTRACT

A glass holding device for mid-gates of vehicles is disclosed. In the glass holding device, a first hinge unit is provided at the upper portion of a gate body for rotatably connecting the lower end of a glass to the upper portion of the gate body. A folding trim panel is rotatably mounted at the lower end thereof to the lower portion of the gate body using a second hinge unit. A panel fastening unit fastens or releases the trim panel to or from the gate body. In order to house the glass in the gate body prior to laying down the mid-gate on the floor of the vehicle for unifying a passenger compartment and a cargo compartment into a single compartment, the glass is easily and simply rotated downward around the first hinge unit, and so it is easy to manipulate the mid-gate. Since the trim panel covers the folded glass, it is possible to safely and cleanly protect the folded glass when laying down the mid-gate.

3 Claims, 4 Drawing Sheets

GLASS HOLDING DEVICE FOR MID-GATES OF VEHICLES

BACKGROUND OF THE INVENTION

1. Field of the Invention

The present invention relates, in general, to a glass holding device for mid-gates of vehicles, such as SUTs (sport utility trucks) having a passenger compartment and a cargo compartment partitioned by a mid-gate, and loading passengers in addition to hauling light freight, and, more particularly, to a glass holding device for such mid-gates designed to safely and easily house the glass in the gate body when laying down the mid-gate to unify the two compartments into a single compartment.

2. Description of the Prior Art

There have been proposed and used in some vehicles, such as SUTs, having a passenger compartment and a cargo compartment in front and back of a mid-gate, respectively. As shown in FIGS. 1 and 2, the mid-gate 100 of such a vehicle has a folding structure for allowing a user to partition or unify the passenger compartment and the cargo compartment as desired. The mid-gate 100 typically has a gate body 101 at its lower portion and a glass 102 at its upper portion. Since the mid-gate 100 is sometimes required to be laid on the floor of a vehicle to unify the passenger and cargo compartments into a single compartment, the mid-gate 100 is preferably designed such that it is transformed into a compact size.

In order to accomplish the above object, the mid-gate 100 according to an embodiment of the prior art is designed such that its glass 102 is slidably extended from or retracted into a glass reception space defined in the gate body 101 as shown in FIG. 3. In another embodiment of the prior art, the mid-gate 100 is designed such that the glass 102 is rotatably connected to the upper portion of the gate body 101 so as to be folded relative to the body 101 as shown in FIG. 4.

However, the conventional mid-gate 100 having the sliding structure of FIG. 3 has the following problems. That is, a substantial gap "G" must be formed between the gate body 101 and the glass 102 so as to allow a smooth sliding movement of the glass 102 relative to the gate body 101. Due to the gap "G", the mid-gate 100 undesirably generates noise during a sliding movement of the glass 101 in the gate body 101, in addition to causing an easy breakage of the glass 102 when the glass 102 is subjected to an impact. The above mid-gate 100 also forces a user to forcibly draw the grass 102 upward from the gate body 101 when it is necessary to partition the passenger compartment from the cargo compartment. The mid-gate 100 is thus inconvenient to users.

The mid-gate 100 having the glass folding structure of FIG. 4 is problematic as follows. That is, the mid-gate 100 with the exposed and folded glass 102 must be rotated to partition or unify the passenger compartment and the cargo compartment, the glass 102 may be easily contaminated with impurities on its surfaces, or may be easily broken when it collides with a hard material.

SUMMARY OF THE INVENTION

Accordingly, the present invention has been made keeping in mind the above problems occurring in the prior art. An object of the present invention is to provide a glass holding device for mid-gates of vehicles, which is designed to safely and easily house a glass in a gate body when unifying a passenger compartment and a cargo compartment into a single compartment by laying down a mid-gate on the floor of a vehicle.

In order to accomplish the above objects, the present invention provides a glass holding device for mid-gates of vehicles, comprising: a first hinge unit provided at the upper portion of a gate body for rotatably connecting the lower end of a glass to the upper portion of the gate body; a folding trim panel rotatably mounted at the lower end thereof to the lower portion of the gate body using a second hinge unit; and a panel fastening unit for fastening or releasing the trim panel to or from the gate body.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
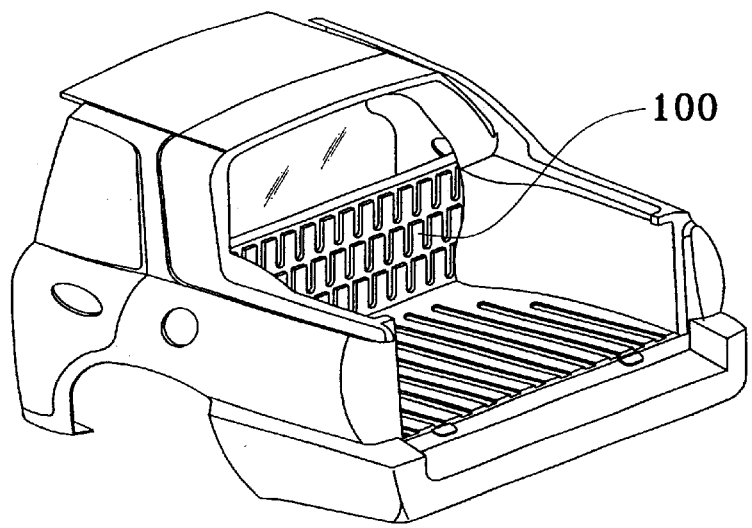
FIG. 1 is a rear perspective view of a vehicle, with a conventional mid-gate, in an upright position to partition a passenger compartment from a cargo compartment.
Figure 2:
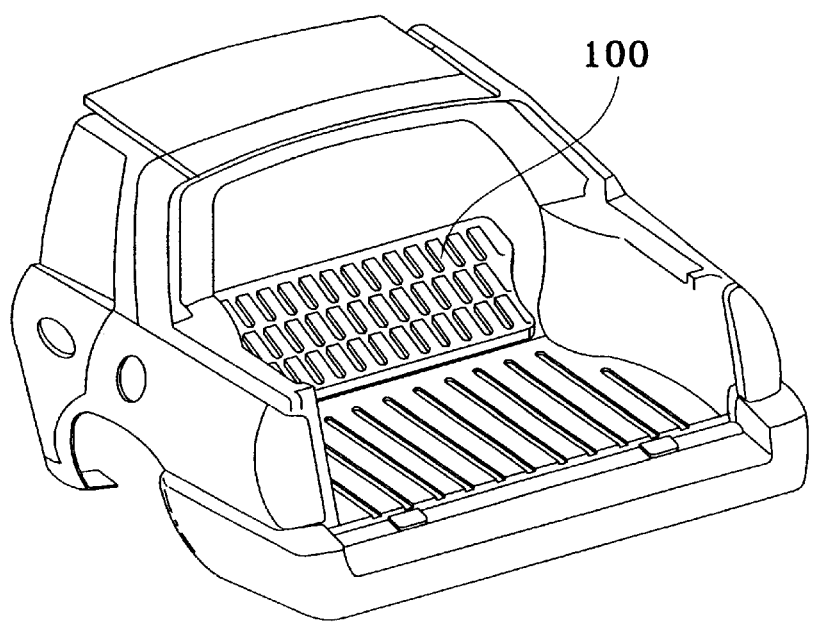
FIG. 2 is a rear perspective view of the vehicle of FIG. 1, with the conventional mid-gate laid on the floor of the vehicle to unify the passenger compartment and the cargo compartment into a single compartment.
Figure 3:
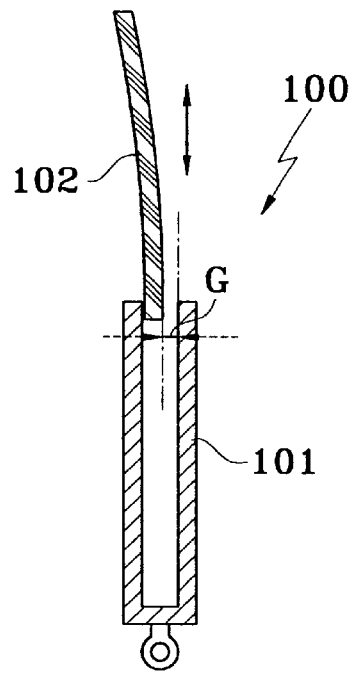
FIGS. 3 and 4 are sectional views of conventional glass holding devices for such mid-gates according to different embodiments of the prior art.
Figure 4:
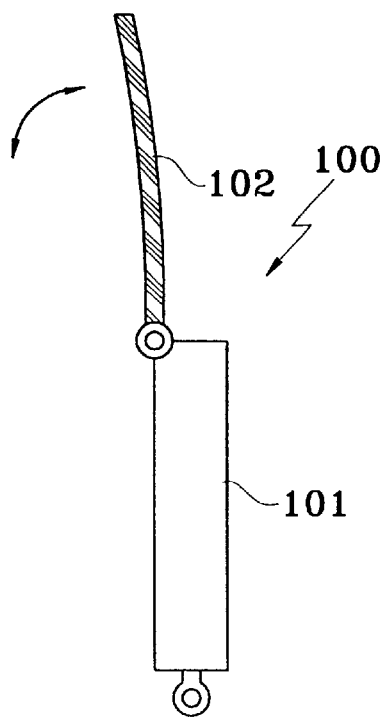

Reference now should be made to the drawings, in which the same reference numerals are used throughout the different drawings to designate the same or similar components.

Figure 5A:
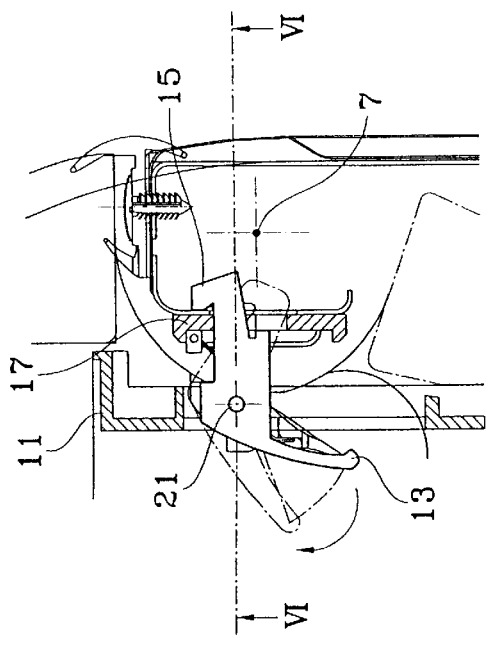
FIG. 5A is an exploded view of a top hinge unit of the glass holding device according to the preferred embodiment of the present invention.
Figure 5B:
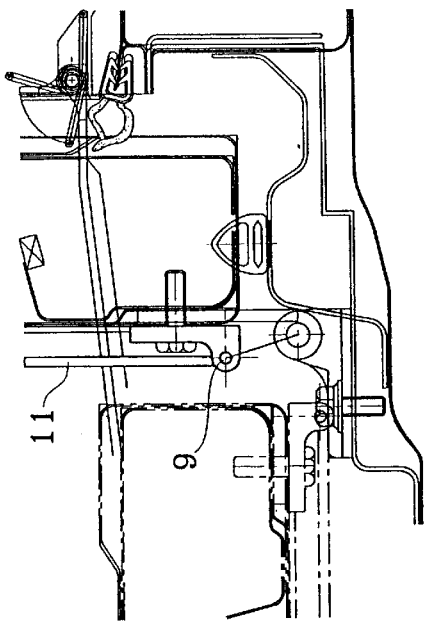
FIG. 5B is an exploded view of a bottom hinge unit of the glass holding device according to the preferred embodiment of the present invention.
Figure 5:
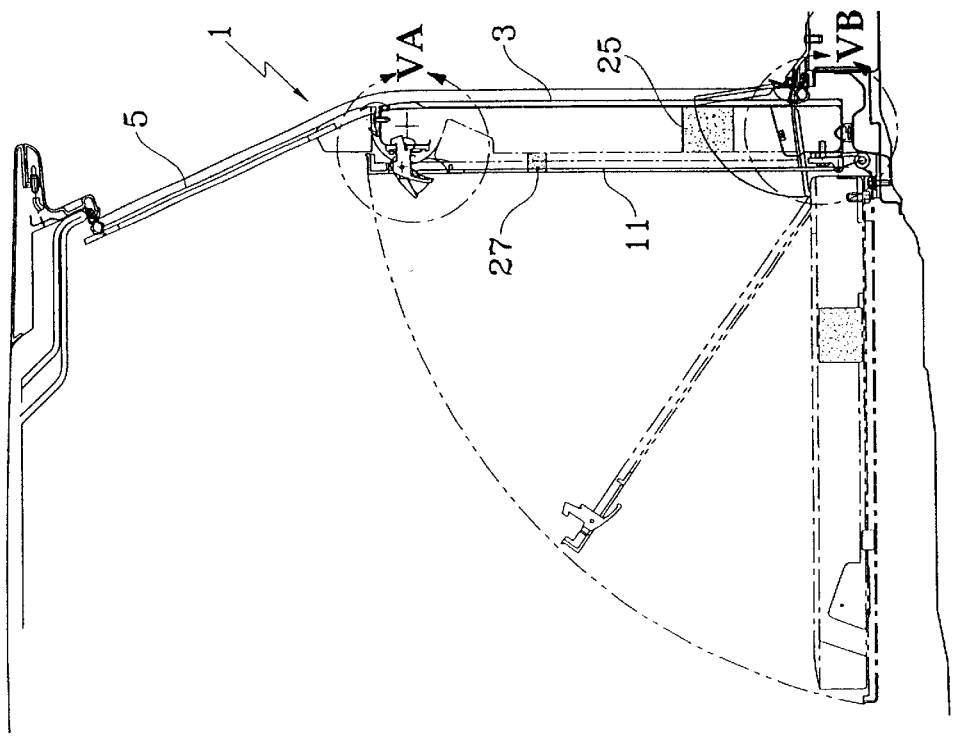
FIG. 5 is a sectional view of a glass holding device for mid-gates of vehicles according to the preferred embodiment of the present invention.
Figure 6:
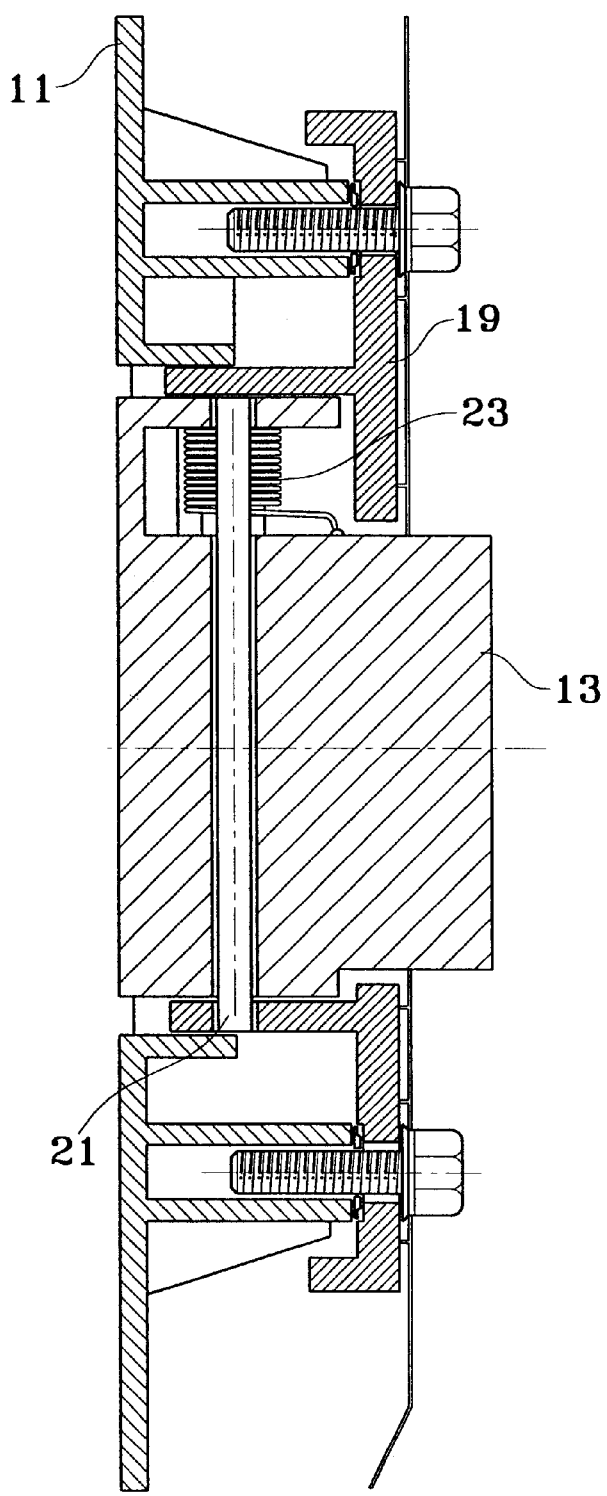
FIG. 6 is a sectional view of the glass holding device of this invention, taken along the line VI—VI of FIG. 5.

FIG. 5 is a sectional view of a glass holding device for mid-gates of vehicles according to the preferred embodiment of the present invention. FIG. 5A illustrates an exploded view of the top hinge unit of FIG. 5 and FIG. 5B illustrates an exploded view of the bottom hinge unit of FIG. 5. FIG. 6 is a sectional view taken along the line VI—VI of FIG. 5, showing a handle of the glass holding device.

A mid-gate 1, partitioning a passenger compartment from a cargo compartment as shown in FIG. 5, comprises a gate body 3 at its lower portion and a glass 5 at its upper portion. The glass 5 is rotatably connected at its lower end to the upper portion of the gate body 3 by a first hinge unit 7, and so the glass 5 is rotated around the first hinge unit 7 such that it is folded downward to a side surface of the gate body 3.

The side surface of the gate body 3 has a space sufficiently receiving the glass 5 when the glass 5 is folded to the gate body 3. A folding trim panel 11 is rotatably mounted at the lower end thereof to the lower portion of the gate body 3 using a second hinge unit 9. The trim panel 11 is rotated around the second hinge unit 9 so as to be upwardly folded to the side surface of the gate body 3 while covering the folded glass 5.

The glass holding device of this invention also has a panel fastening unit for locking or releasing the trim panel 11 to or from the upper portion of the gate body 3. The panel fastening unit maintains the folded state of the trim panel 11 relative to the gate body 3 while allowing the folded panel 11 to be released from the upper portion of the gate body 3. In the preferred embodiment of this invention, the panel fastening unit comprises a spring-biased handle 13 and a stopper 17. The spring-biased handle 13 is rotatably mounted to the trim panel 11 and has a hook 15, while the stopper 17 is provided at the gate body 3 for catching the hook 15 of the handle 13 so as to hold the folded panel 11 to the upper portion of the gate body 3.

In a detailed description, a handle base 19 is mounted to the trim panel 11, while the handle 13 is rotatably mounted to the handle base 19 using a hinge 21. A torsion spring 23 is set in the panel fastening unit for angularly biasing the handle 13 in one direction such that the hook 15 of the handle 13, that is caught by the stopper 17, is normally and elastically maintained at the 'caught' state. When a user manipulates the handle 13 while overcoming the spring force of the torsion spring 23, the hook 15 of the handle 13 is released from the stopper 17. The panel 11 is thus allowed to be rotated downward to open the glass reception space of the gate body 3.

In the glass holding device of this invention, the gate body 3 and the trim panel 11 are provided with support pads 25 and 27 for stably supporting the two side surfaces of the glass 5 folded to the gate body 3.

The operational effect of the glass holding device of this invention will be described herein below.

When it is required to lay down the mid-gate 1 on the floor of the vehicle so as to unify the passenger and cargo compartments into a single compartment, a user manipulates the handle 13 to release the folded trim panel 11 from the upper portion of the gate body 3 prior to opening the glass reception space of the gate body 3, by rotating the panel 11 downward around the second hinge unit 9. Thereafter, the glass 5 is released from a glass locking means of the vehicle's body and is rotated downward around the first hinge unit 7, thus being folded to the side surface of the gate body 3.

After folding the glass 5 to the gate body 3, the trim panel 11 is rotated upward around the second hinge unit 9 to cover the folded glass 5. In such a case, when the stopper 17 of the gate body 3 catches the hook 15 of the handle 13, the hook 15 is elastically maintained at the caught state due to the spring force of the torsion spring 23. The trim panel 11 thus stably covers the folded glass 5.

After the trim panel 11 is rotated upward to cover the folded glass 5 as described above, the gate body 3 is laid on the floor of the vehicle to unify the passenger compartment and the cargo compartment into a single compartment. It is thus possible to enlarge the cargo compartment of the vehicle.

In the glass holding device of this invention, the gate body 3 and the trim panel 11 are provided with the support pads 25 and 27, and the side surfaces of the glass 5 folded to the gate body 3 are stably supported by the pads 25 and 27 when the trim panel 11 is rotated upward to cover the glass 5. Therefore, it is possible to safely and cleanly protect the folded glass 5 when the mid-gate 1 is laid on the floor of the vehicle to unify the passenger and cargo compartments into a single compartment.

When it is required to partition the cargo compartment from the passenger compartment, the mid-gate 1 is operated in the reverse order. That is, the mid-gate 1 laid on the floor of the vehicle is primarily rotated upward from the floor until the mid-gate 1 stands upright on the floor. Thereafter, the handle 13 is manipulated to rotate the trim panel 11 downward to open the glass reception space of the gate body 3, and so the folded glass 5 is exposed to the outside. The exposed glass 5 is rotated upward around the first hinge unit 7, and is locked to the glass locking means of the vehicle's body through a conventional locking mechanism. Thereafter, the trim panel 11 is rotated upward until the stopper 17 of the gate body 3 catches the hook 15 of the handle 13. The panel 11 thus closes the glass reception space of the gate body 3.

As described above, the present invention provides a glass holding device for mid-gates of vehicles, which is designed to safely and easily house a glass in a gate body when unifying a passenger compartment and a cargo compartment into a single compartment. In order to house the glass in the gate body, the glass is easily and simply rotated downward around a hinge unit connecting the glass to the gate body, and so it is easy to manipulate the mid-gate. In the glass holding device, a trim panel covers the folded glass, and so it is possible to safely and cleanly protect the folded glass when laying down the mid-gate to unify the passenger and cargo compartments into a single compartment.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A glass holding device for mid-gates of vehicles, comprising:

a first hinge unit provided at an upper portion of a gate body for rotatably connecting a lower end of a glass to said upper portion of the gate body;

a folding trim panel rotatably mounted at a lower end thereof to a lower portion of said gate body using a second hinge unit; and a panel fastening unit for fastening or releasing said trim panel to or from the gate body.

2. The glass holding device according to claim 1, wherein said panel fastening unit comprises:

a spring-biased handle rotatably mounted to said trim panel and provided with a hook; and a stopper provided at the gate body for catching the hook of the spring-biased handle.

3. The glass holding device according to claim 1, wherein the gate body and the trim panel are provided with support pads for supporting side surfaces of the glass folded to the gate body.

* * * * *